Sept. 8, 1925.
M. LIND ET AL
1,553,180
WATER HEATER
Filed March 15, 1922
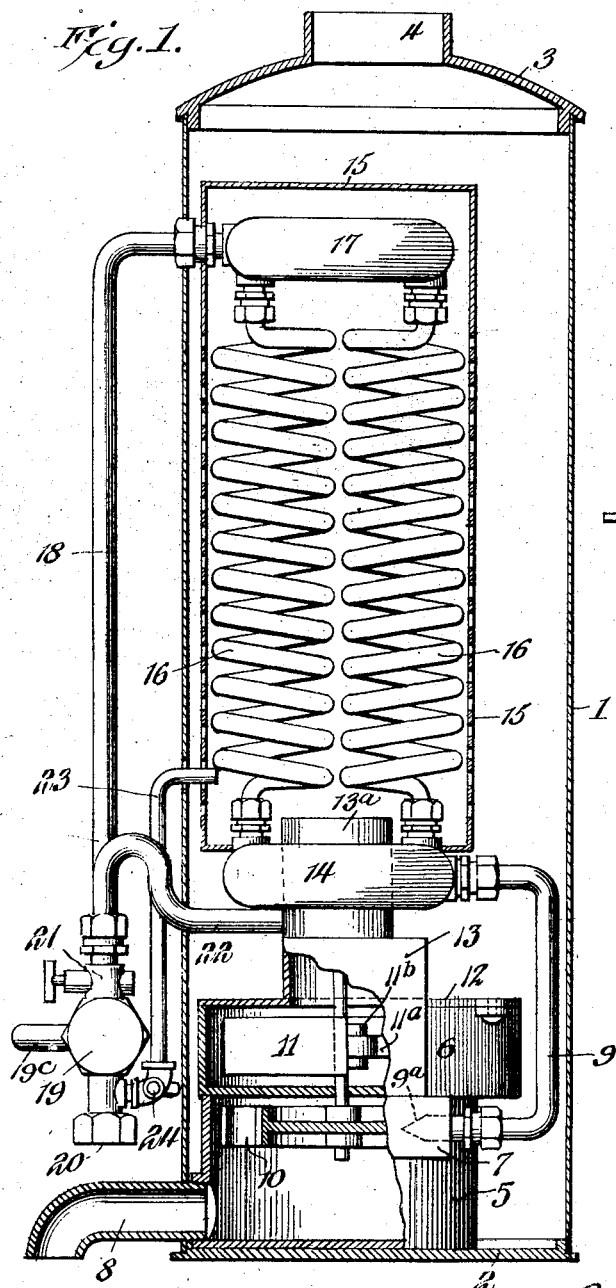
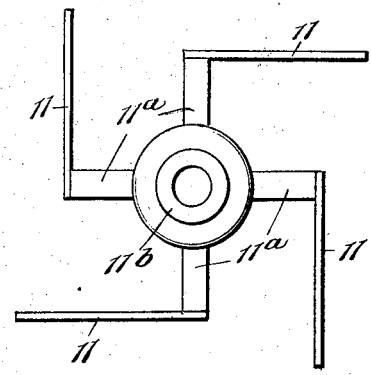
INVENTORS Patented Sept. 8, 1925.

1,553,180

UNITED STATES PATENT OFFICE.

MATHILDE LIND AND WERNER C. LIND, OF NEW ORLEANS, LOUISIANA.

WATER HEATER.

Application filed March 15, 1922. Serial No. 543,942.

*To all whom it may concern:*

Be it known that we, MATHILDE LIND and WERNER C. LIND, citizens of the United States, residing at New Orleans, in the parish of Orleans and State of Louisiana, have invented new and useful Improvements in Water Heaters, of which the following is a specification.

Our present invention pertains to hot water heaters of the instantaneous igniting type, and it contemplates the provision of a heater that is simple in construction and operation and one through the medium of which the mixing of the air and combustible gas is accomplished with a great amount of facility and in such a thorough manner that all poisonous gas is quickly and effectually consumed.

The invention further contemplates the provision of a hot water heater of the type set forth whereby the outlet vent ordinarily employed may be dispensed with as all of the gas is thoroughly ignited at all times, and such thorough mixing consumes all carbon and also gases engendered by combustion thus producing a greater amount of heat than is the case with similar heaters now in use.

The invention in all of its details will be fully understood from the following description and claim, when the same are read in connection with the drawings, accompanying and forming part of this application, in which:

Figure 1 is a longitudinal sectional view showing a water heater equipped with our novel improvements.

Figure 2 is a top plan view of the fan blower we employ in the base of the water heater.

Similar numerals of reference designate corresponding parts in both views of the drawings.

Our present invention comprises a casing 1 having a base 2 and a hood 3 that is open at 4 and arranged within the lower end of the casing 1 is a water collecting pan 5 and mounted above this pan is a housing 6 for a blower or fan hereinafter referred to. As shown in Figure 1 we provide a main water supply pipe 18 that communicates with an upper manifold 17 which manifold in turn communicates with the coils 16 that also communicate with the lower manifold 14. As clearly shown in Figure 1 an interior casing 15 surrounds the coils 16 and upper manifold 17. Communicating with the lower manifold 14 is a pipe 9 that extends downwardly and then inwardly and enters the portion or chamber 7 of the pan 5 and this pipe 9 is by preference provided with a nozzle $9^a$ shown in dotted lines in Figure 1. A mixing chamber 13 is mounted on the pan 5 and said chamber 13 is provided with a burner $13^a$, and this chamber 13 communicates with a gas supply pipe 22.

Arranged in the upper end of the pan 5 is a turbine wheel 10 that is operated by the action of water from the nozzle $9^a$ and the said wheel 10 is mounted in a fixed manner on a shaft that rotates therewith and the said shaft also operates a fan which comprises a collar $11^b$, arms $11^a$ and the blade portions 11 as clearly shown in Figure 1. The shaft is journaled in proper bearings of the housing 6. Arranged in the bottom of the pan 5 is an outlet 8. Valves 19, 21 and 24 are placed in the pipes 18 and 22 and the pilot tube 23 to control flow therethrough. $19^c$ is the operating handle of valve 19. A plug 20 is provided at the point illustrated.

It will be gathered from the foregoing that our novel device comprises the pan 5 in which the turbine 10 rotates while the shaft that extends through the collar $11^b$ and said turbine 10 is rotated by water from the pipe 9. This shaft also extends into the blower housing 6 to rotate the fan in a direction similar to that of the turbine. Such rotation of the fan will promote combustion of the gas and assure even heating of the water to a high degree.

The invention is extremely simple in operation and comprises but a few elements and the heating of water by use of our novel device will be accomplished in a short period of time and therefore but a small amount of gas for heating said water will manifestly be required.

Having described our invention, what we claim and desire to secure by Letters Patent is:—

In an air and gas mixing device the combination of a mixing chamber; a gas feed pipe to the mixing chamber, said chamber being open at its lower end; a housing below the chamber; a shaft mounted to rotate in said chamber and housing; a fan mounted in said housing and rotatable with the shaft; a water pan below the housing; a water inlet pipe to said water pan; and a turbine on the shaft within the water pan so arranged that water entering the pan will operate the turbine to rotate the shaft and fan.

In testimony whereof they have hereunto set their hands.

MATHILDE LIND.
WERNER C. LIND.